June 4, 1935.　　O. R. SWEENEY ET AL　　2,003,760
INDICATOR FOR ZEOLITE SOFTENERS
Filed March 3, 1930

Inventors:
Orland R. Sweeney
Thomas B. Clark
By Wilson, Bowell, McCanna & Behm Attys.

Patented June 4, 1935

2,003,760

UNITED STATES PATENT OFFICE 2,003,760

INDICATOR FOR ZEOLITE SOFTENERS

Orland R. Sweeney, Ames, Iowa, and Thomas B. Clark, Rockford, Ill., assignors, by mesne assignments, to The Permutit Company, (1934), Wilmington, Del., a corporation of Delaware Application March 3, 1930, Serial No. 432,632

7 Claims. (Cl. 177—311)

Our invention relates to base exchange water softeners and has special reference to means attached thereto for indicating the degree of exhaustion of the bed during operation. It is particularly adapted for use with large industrial water softening plants wherein it is necessary for the operator to be constantly vigilant to prevent the zeolite bed from being totally exhausted and hard water from being thereby discharged into the system.

In large industrial water softening systems such, for example, as those softening up to five million gallons of water per day, it is necessary to regenerate the base exchange bed of a battery of such softeners at very frequent intervals. In some of these installations the zeolite is regenerated a number of times per day. Obviously it is necessary for the operator to be constantly vigilant to determine the time at which the zeolite of each softener becomes exhausted and fails to convert the incoming hard water to soft water. The effluent water from such a softener may, within a very short time, change from completely soft water to completely hard water, and the operator has no satisfactory means for determining in advance just when this change will occur and when regeneration will be required.

The amount of water that can be softened by a bed of zeolites may be roughly determined by metering the water passing through the softener and measuring the amount of water which may pass through the softener before hard water appears in the effluent line. In many instances this is not a reliable guide because the hardness of the water may gradually vary from season to season and the measurement must therefore be constantly altered to suit the hardness of the water. At best this means provides but a rough indication of the exact time when regeneration will be necessary. In spite of these measurements it is necessary to make periodic hardness tests upon the effluent water to determine the exact point of exhaustion. This requires the constant supervision and personal attention of the operator when the softener is approaching the point of exhaustion. In many installations it is imperative that no hard water at all get into the service line. To guard against this, the zeolites are generally regenerated well before their softening capacity is exhausted, thereby having a too wide margin of safety, at the expense of economy. Accurate control has not been possible.

In some instances an alarm meter is used to sound and alarm when the predetermined amount of water has passed through the softener, thus approximately indicating the point at which exhaustion occurs. Such a system permits the operator to be relieved of constant personal supervision of the softener and permits him to employ his time at other duties. However, when this alarm rings, the softener demands immediate attention. He has no means of knowing in advance the time which may elapse before the softener will require regeneration.

None of these systems provide means whereby a central control system may be used from which a plurality of softeners may be controlled by a single operator. By the old method of operation each of the softeners will require the personal attention of the operator to determine the point of exhaustion.

Therefore, one of the principal objects of our invention is to provide means for indicating the progress of the exhaustion of a zeolite softener bed; our invention also including a method of operating wherein the water is tested for hardness at different points in the bed and regeneration is started when the hardness appears at one of the points within the bed.

We have also aimed to provide means for visibly indicating when the bed of a zeolite softener is exhausted or nearly exhausted so that regeneration may be started before complete exhaustion.

Another object of the invention is to provide means for transmitting a plurality of signals from the softener to a point at a distance therefrom for indicating the degree of exhaustion of the softener.

A still further object of the invention is to provide means attached to a zeolite softener at spaced intervals along the bed of zeolite for actuating a signal device which is dependent upon the hardness of the water.

Figure 2:
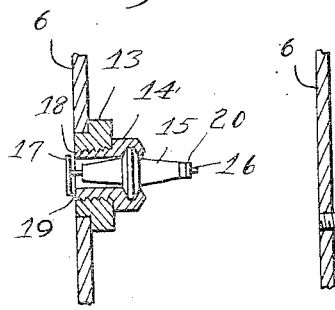
Fig. 2 is a vertical section through a conductivity cell and the casing showing the manner in which the cells are mounted in the latter.

In the illustrated embodiment of our invention a plurality of conductivity cells, such as that shown in Fig. 2, are placed in the wall or casing of the softener at predetermined spaced intervals, along the bed of base exchange material. Each of the cells is connected to a relay which is arranged to make and break a power circuit in which a lamp is situated. When the bed has become exhausted to a point beyond the first cell hard water will pass through this cell. When this occurs the conductivity of the water in the cell being materially less than the conductivity of the previously flowing soft water, the current passing through the relay will be less, permitting the relay to drop back, closing the power circuit and switching on the signal lamp. As the bed becomes further exhausted hard water will appear at successive cells and other lamps will be progressively lighted as the exhaustion of the bed progresses.

The invention takes advantage of the manner in which the base exchange material of a softener becomes exhausted. We have found that the exhaustion of the bed is progressive. For example, let us consider an upflow base exchange softener. At the beginning of the service run all of the material is substantially active. Hard water enters the bottom of the softener and the hardness is removed therefrom by the first mineral with which the water comes in contact. The soft water then proceeds up through the remainder of the mineral bed. As hard water continues to enter, the first layer of mineral becomes exhausted and the exchange is carried on by the next succeeding layer. In this manner the level of exhausted mineral gradually creeps up along the bed. Therefore, at any intermediate period of the service run, examination of the bed will show it to consist of a lower layer of substantially completely exhausted mineral, an intermediate layer, usually small, of partially exhausted mineral, and an upper layer of completely active mineral.

We have arranged to provide means in the container, placed in the direction of flow of the water, to indicate the progress of the exhaustion of the mineral bed. This means consists of devices actuated by the change in conductivity of the water at spaced intervals along the bed. These devices may include a light, a bell, or any other suitable mechanism for providing a signal or making a recording.

Figure 1:
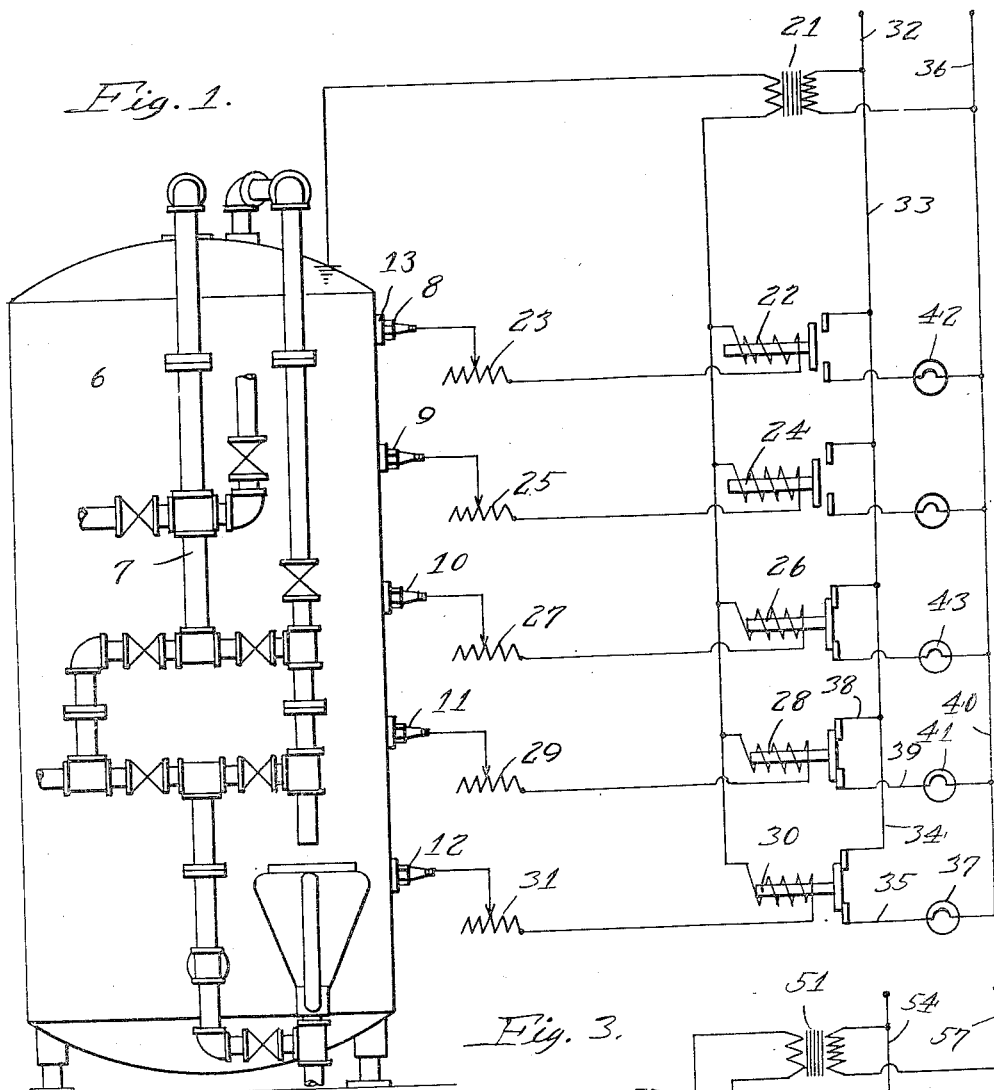
Fig. 1 is a diagrammatic showing of our improved signaling device attached to a conventional base exchange industrial softener.

Referring now to Figure 1, the numeral 6 designates a conventional industrial zeolite water softening unit provided with the usual operating appliances indicated generally by the numeral 6. In this particular instance, we have shown a vertical upflow softener, the water, during the service run, entering at the bottom of the softener and progressing upward, leaving the softener at the top thereof. Along the sides of the softener tank we have positioned vertically spaced conductivity cells indicated generally by the numerals 8, 9, 10, 11 and 12, one of which is shown more in detail in Fig. 2. Referring now to Fig. 2 showing a conductivity cell and the manner in which it is mounted in the softener tank, a threaded flange 13 is positioned in the side of the tank to receive the cell 8. Each of the cells resembles somewhat, in appearance, the ordinary spark plug used in internal combustion engines, and is provided with an outer threaded casing 14 arranged to engage the flange 13. A porcelain or other insulating member 15 is secured within the cylindrical casing 14 and is provided with a central conductor 16 passing completely therethrough. The inner end of the conductor 16 is provided with a disk 17 of metal or other suitably conductive material. This disk 17 is arranged to overlap the inner end 18 of the casing 14 and is spaced therefrom as shown at 19 to permit the water, moving upwardly through the softener, to pass therebetween. The outer end of the conductor 16 is provided with knurled nuts 20, or other suitable devices permitting an electrical connection. It will thus be seen that the cell is so constructed as to permit a voltage to be impressed across the space 19 in which the upwardly moving water of the softener passes.

Referring again to Fig. 1, the conductivity cell 8 is made to form a portion of a circuit including a step-down transformer 21 situated in a power line, a relay 22, and a variable resistance 23, the tank or casing 6 of the softener forming one of the conductors of the circuit. In like manner the second conductivity cell 9 is made a portion of the electrical circuit including the transformer 21, the relay 24, and a variable resistance 25; the third cell 10 is made a portion of the circuit including the transformer 21, the relay 26, and a variable resistance 27; the cell 11 is made a portion of the circuit including the transformer 21, the relay 28, and a variable resistance 29; and the conductivity cell 12 is made a portion of the circuit including the transformer 21, a relay 30, and a variable resistance 31.

When soft water is passing through the softener and through each of the conductivity cells the variable resistances, 23, 25, 27, 29, and 31, are each set so that the corresponding relays 22, 24, 26, 28 and 30, are just maintained in the open position by the current passing through each of the circuits. The relays will all be maintained in the open position until hard water begins to appear in the space 19 of the cell 12. When this occurs the conductivity of the cell 12 will be decreased, due to the fact that hard water is a poorer conductor of electricity than soft water having an equivalent concentration of salts in solution. The decrease in conductivity of the cell 12 decreases the amount of current flowing in the circuit 12, 21, 30 and 31 and permits the relay 30 to close. Closing of the relay 30 closes a power circuit 32, 33, 34, 35, 36 having an electric bulb 37 therein, thereby producing a light signal to the operator that the band of hardness in the softener has progressed to the level of the cell 12. In like manner when the band of exhaustion has reached the conductivity cell 11 the relay 28 will be permitted to close, closing the power circuit 32, 33, 38, 39, 40 and 36, in which the electric bulb 41 is positioned. The process continues as the band of exhaustion moves up the bed of zeolite and reaches successive conductivity cells until the cell 8 is reached when the lighting of the bulb 42 indicates that the base exchange bed is completely exhausted and the softener must be regenerated. In Fig. 1 the band of exhausted mineral is shown as having moved upward so far as conductivity cell 10, closing relays 30, 28, and 26 and lighting electric lamps 37, 41 and 43.

Figure 3:
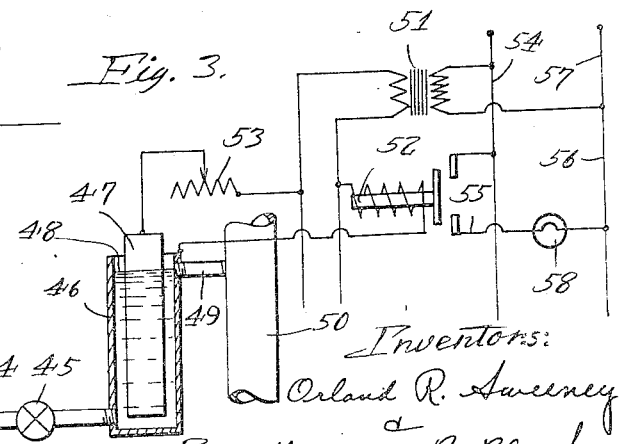
Fig. 3 is a diagrammatic and fragmentary showing of a modified arrangement.

Means other than that shown in Fig. 1 may be employed in actuating the signal device herein. Fig. 3 shows a modification wherein water is removed from the base exchange bed through the casing 6, at a plurality of points, by means of a plurality of pipes 44 suitably positioned in the walls of the casing. Valves 45 are positioned on the pipes 44 in order to regulate the flow of water therethrough. A conductivity cell having a cylindrical outer wall 46 and an inner electrode 47, is positioned on the end of each of the pipes 44 and is arranged to receive water from the pipe 44 which passes into and through the chamber 48 formed between the cell wall 46 and the central electrode 47. The water passes out from the cylinder 46 through a pipe 49 into a drain pipe 50.

It will be seen that the electrical connections are substantially identical with those shown in Fig. 1, each circuit including a step-down transformer 51, a relay 52, and a variable resistance 53, which are associated and employed in the same manner as previously described. In like manner a power circuit 54, 55, 56, and 57, including a signal bulb 58, is actuated by the conductivity circuit as previously described in connection with Figure 1.

The hardness detectors need not be conductivity-measuring devices. They may make use of other differences in the properties of hard and soft water; for instance, the ability of soft water to make a froth with soap solution, whereas hard water does not make a froth. Or hardness can be detected by using a photo-electric device responding to the difference between the opacity of soft water containing soap and that of hard water containing soap. A hardness tester of the first type is disclosed in the copending application of Clark Ser. No. 169,827, Patent 1,903,957, in which is disclosed a hardness tester wherein a mixture of effluent water and soap solution is passed continuously through a cell, and air is continuously passed into the cell to agitate and blow up the mixture, forming a froth or foam as long as the effluent water remains soft. Two electrical contacts, connected with switch means, are arranged to dip into the froth and have the circuit between them closed by the froth. Upon appearance of hardness in the effluent water, froth is no longer formed, and the contact is broken, actuating the switch means. A hardness tester of the photoelectric cell type is disclosed in our copending application Ser. No. 432,633. Soap solution and effluent water are continuously passed through a cell with transparent walls. The mixture is substantially transparent so long as the effluent water is soft, but upon appearance of hardness an opaque precipitate forms. This is made use of by having a source of light on one side of the cell, and a photoelectric cell on the other side, the photoelectric cell being connected with a relay adapted to operate a switch controlling a signal lamp. Upon development of opacity in the absorption cell, the change in the amount of light reaching the photoelectric cell causes the latter cell to actuate the relay and switch. Either of these devices may be used in lieu of devices making use of varying conductivity such as described in the present specification.

It will be seen from the foregoing that we have provided means for automatically indicating the degree of exhaustion of a base exchange water softener. The signal lamps may be placed in a central control station from which point a plurality of softeners may be directed by a single operator. Of course, where the softeners are hand operated it will be necessary for the operator to give the softeners individual attention when the time for regeneration occurs, but he need not be constantly in attendance at a single softener in order to determine the time at which hard water appears at the upper end of the softener and the bed of base exchange material is exhausted. It is obvious that at a single glance at a bank of lights the operator may know instantly the degree of exhaustion of a softener or softeners in operation.

A recording device may be actuated from the cells in place of the signal lamps to permit a continuous printed record to be made of the progress of exhaustion of the bed. In this manner supervising authorities may determine from the charts of the recording device whether the softeners have been regenerated at the proper time.

While we have thus described and illustrated a specific embodiment of our invention we are aware that numerous alterations and changes may be made therein and we do not wish to be limited except by the prior art and the scope of the appended claims in which—

We claim:

1. A water softener comprising a chamber, a hard water inlet, a soft water outlet, a bed of base exchange material within said chamber positioned intermediate said inlet and said outlet, and electrical means also intermediate said inlet and said outlet and responsive to a change in hardness of water for detecting and indicating the progressive exhaustion of said bed of base exchange material.

2. In a water softener having a chamber containing base exchange material, a hard water inlet and a soft water outlet, electrical means interposed between said inlet and said outlet and responsive to a change in hardness of water for the stepwise detection and indication of the progressive exhaustion of said bed of base exchange material.

3. The apparatus of claim 2 in which said means is responsive to the electrical conductivity of the water passing through said softener.

4. A water softener comprising a bed of base exchange material, and electrical means responsive to the hardness of the water flowing through said softener in operative relation with respect to water which has passed through a portion only of the said bed of base exchange material.

5. In a regenerative water softener having a hard water inlet and a soft water outlet with a bed of base exchange material interposed between said inlet and said outlet, means for detecting the exhaustion of said bed which comprises electrical means responsive to a change in hardness of water placed in operative relation with said bed at a point part way along the length of said bed.

6. A water softener comprising a bed of base exchange material and an electrolytic conductivity cell positioned in water which has passed through a portion only of said bed for detecting the exhaustion of said portion.

7. A water softener comprising a bed of base exchange material through which water flows during softening and electrical means responsive to the hardness of said water arranged at spaced intervals along said bed in the direction of flow of said water.

ORLAND R. SWEENEY.
THOMAS B. CLARK.